United States Patent [19]

Yoshida et al.

[11] Patent Number: 4,965,814
[45] Date of Patent: Oct. 23, 1990

[54] SYNCHRONIZER FOR ESTABLISHING SYNCHRONIZATION BETWEEN DATA AND CLOCK SIGNALS

[75] Inventors: Norio Yoshida; Hiroshi Shimizu, both of Tokyo, Japan

[73] Assignee: NEC Corporation, Tokyo, Japan

[21] Appl. No.: 299,488

[22] Filed: Jan. 23, 1989

[30] Foreign Application Priority Data

| Jan. 21, 1988 | [JP] | Japan | 63-11943 |
| Mar. 14, 1988 | [JP] | Japan | 63-60888 |
| Mar. 14, 1988 | [JP] | Japan | 63-60889 |
| May 18, 1988 | [JP] | Japan | 63-122555 |

[51] Int. Cl.$^5$ .............................................. H04L 7/06
[52] U.S. Cl. .................................... 375/111; 375/118; 307/527
[58] Field of Search ............... 375/110, 106, 113, 120, 375/118, 111, 114, 116; 307/511, 513, 514, 525, 527

[56] References Cited

U.S. PATENT DOCUMENTS

| 3,699,261 | 10/1972 | Tomozawa | 375/120 |
| 3,944,940 | 3/1976 | Desai | 375/120 |
| 4,821,295 | 4/1989 | Sanner | 307/527 |
| 4,821,297 | 4/1989 | Bergmann et al. | 375/120 |

*Primary Examiner*—Benedict V. Safourek
*Assistant Examiner*—Marianne Huseman
*Attorney, Agent, or Firm*—lr; Sughrue, Mion, Zinn, MacPeak & Seas

[57] ABSTRACT

A frame synchronizer comprises a frame sync detector for detecting a frame sync pattern multiplexed with a data signal. First and second counters are incremented in response to an input clock signal to generate output signals at frame intervals. A mismatch detector detects a first mismatch between the output of sync detector and the output of first counter and a second mismatch between the sync detector output and the output of second counter. To reduce resynchronization period, the second counter is disabled in response to the detection of the second mismatch and its binary count is loaded into the first counter upon detection of the first mismatch. According to a different aspect, a bit synchronizer includes a plurality of latches connected to a data input terminal for respectively latching a data signal in response to a latch timing signal applied thereto. A mismatch detector is provided for detecting a mismatch between outputs of the latches. The detection of the mismatch indicates that data and clock inputs has lost bit synchronization and the latch timing pulse is approaching a data transition. Clock input is normally applied from an input terminal to the latches as the latch timing signal. Upon detection of a mismatch, the phase, or logic level of the latch timing signal is reversed to shift is timing to a point where the data signal has a steady logic level.

16 Claims, 18 Drawing Sheets

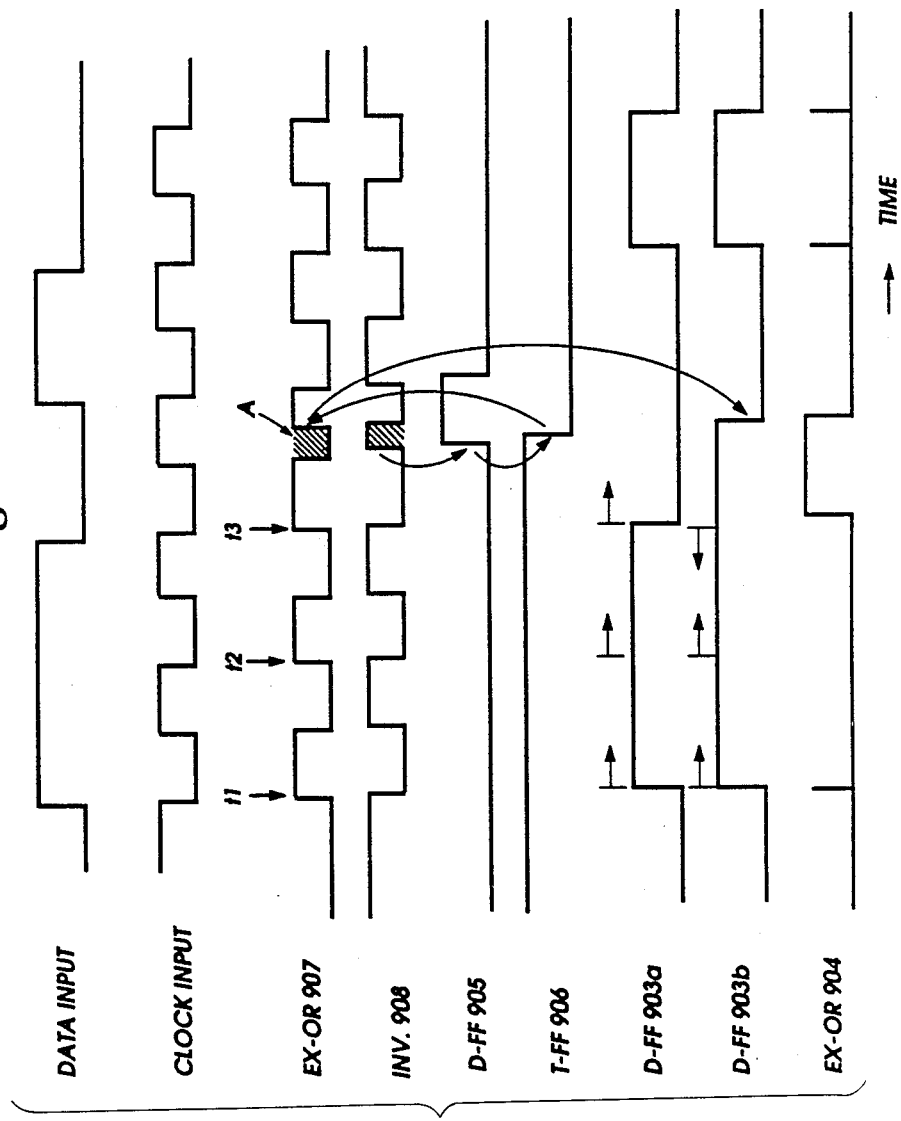

SYNCHRONIZER FOR ESTABLISHING SYNCHRONIZATION BETWEEN DATA AND CLOCK SIGNALS

BACKGROUND OF THE INVENTION

The present invention relates generally to bit or frame alignment techniques, and more specifically to a synchronizer for quickly reestablishing synchronization in digital transmission systems.

As shown in FIG. 1, a known frame synchronizer has a frame sync detector 103 which detects a particular bit pattern signifying the frame start timing of a data bit stream supplied through terminal 101 and supplies a logic-1 output to a coincidence gate 104 and a noncoincidence gate 105 upon detection of a frame bit pattern. Clock input pulses at terminal 102 are supplied through a control gate 108 to a frame counter 110 to generate a logic-1 output at frame intervals so that it coincides with the logic-1 output of frame sync detector 103 when data and clock inputs are in phase with each other at terminals 101 and 102.

When the data input is synchronized with the frame sync timing, a logic-1 output is supplied from coincidence gate 104 to sync guard counter 107 to reset it at frame intervals and a logic-0 output is applied to clock gate 108 to allow passage of input clock pulses to the counter 110, applying a logic-1 output to gates 104 and 105 at frame intervals therefrom. Under this condition, the frame synchronizer is a "forward guard mode". During this mode, possible bit errors in a frame pattern will cause a logic-1 output from noncoincidence gate 105 to be counted by sync guard counter 107 and a logic-1 output is not generated therefrom until the count of N is reached.

When the data input begins to lose frame synchronization, coincidence gate 104 produces a logic-0 output regardless of a logic-1 input from the sync pattern detector 103, while noncoincidence gate 105 produces a logic-1 output, which is counted by sync guard counter 107. At the count of N, a logic-1 output is applied to the clock gate 108 signifying that an outof-sync condition has continued for a period of N consecutive frames. Clock gate 108 is inhibited in response to this logic-1 output and the frame counter 110 enters a hunting mode, which continues until a frame sync pattern is detected the frame sync detector 103. In response to the detection of a frame sync pattern by detector 103, a logic-1 output is supplied to sync guard counter 107 from coincidence gate 104, resulting in the application of a logic-0 input to the clock gate 108 from sync guard counter 107. The frame synchronizer now enters a "backward guard mode" in which frame counter 110 resumes clock counting. During this mode, sync guard counter 107 responds to logic-1 inputs from the coincidence gate 104 by incrementing its count to M. On reaching the count M, the frame synchronizer recognizes that the data and clock inputs have been resynchronized for a period of M consecutive frames and it enters a "forward guard mode". Otherwise, the frame synchronizer recognizes that resynchronization has failed and the sync guard counter 107 produces a logic-1 output to cause the frame counter 110 to reenter the hunting mode. With this prior art frame synchronizer, however, hunting mode does not begin until the count of N is reached in the sync guard counter. Thus, in the worst case, the hunting would take as long as more than one frame interval. This is particularly disadvantageous for transmission systems in which loss of data occurs frequently due to high speed or lengthy frames. Thus, the resynchronization of the prior art synchronizer depends on the frame bit pattern (whether a long string of consecutive bits or bit interleaved with data) employed in a particular transmission system.

Bit synchronization between a data signal and a clock input is established prior to frame synchronization. In a known bit synchronizer shown in FIG. 2, a data signal is applied to a latch 201 and a clock input is applied to a tapped delay line formed by a series of gates 202 to generate plural clock pulses of successively shifted phases for application to a selector 204. A control signal is derived from a preamble contained in the data signal and applied to the selector 204 to selectively couple the clock pulses to the latch 201 to provide bit synchronization between the data signal and the clock signal. However, the use of analog circuit components for deriving different clock timing pulses requires precision and constant adjustment of the delays in accordance with the repetition frequency of the input data signal.

SUMMARY OF THE INVENTION

It is therefore an object of the present invention to provide a synchronizer having a minimum resynchronization period.

Another object of the present invention is to provide a synchronizer which is constructed of logic circuits to simplify circuit configuration and eliminate the need for precision adjustment.

According to a first aspect of the present invention, the synchronizer comprises a frame sync detector for detecting a frame sync pattern multiplexed with a data signal. First and second counters are provided for incrementing respective binary counts in response to a clock signal and generating output signals at frame intervals. A mismatch detector detects a first mismatch between an output signal of the frame sync detector and the output signal of the first counter and a second mismatch between the output signal of the frame sync detector and the output signal of the second counter. To reduce the resynchronization period, the second counter is disabled in response to the detection of the second mismatch and its binary count is loaded into the first counter upon detection of the first mismatch. Preferably, forward and backward guard counters are provided as safeguards for protecting the synchronizer from being affected by bit errors in the frame sync pattern.

Alternatively, the binary count of the first counter is initialized in response to the output signal of the second counter upon detection of the first mismatch.

In a further alternative embodiment, the first and second counters interchange their functions in alternate periods to reduce the resynchronization period. To achieve this interchanging of counter functions, a first mismatch detector detects a first mismatch between the output of frame sync detector received at a first terminal and a signal received at a second terminal and a second mismatch detector detects a second mismatch between the output of frame sync detector received at a first terminal and a signal received at a second terminal. A divide-by-2 counter counts the first mismatch to define the alternate periods. A clock gate is enabled to apply the clock signal to its output terminal in the absence of the second mismatch and disabled in the presence of the second mismatch. In the absence of an output signal from the divide-by-2 counter, first connections are established respectively from a clock input terminal and the output of clock gate on the one hand to input terminals of the first and second counters on the other and second connections are established respectively from output terminals of the first and second counters on the one hand to the second terminals of the first and second mismatch detectors on the other. In the presence of the output signal from the divide-by-2 counter, the first and second connections are reversed to interchange the functions of the first and second counters.

Frame synchronization is correctly esablished after bit synchronization has been established.

According to a second aspect of the invention, bit synchronization is established between data and clock inputs. A plurality of latches are connected to a data input terminal for respectively latching a data signal in response to a latch timing signal applied thereto. A mismatch detector is provided for detecting a mismatch between output signals of the latches. The detection of the mismatch indicates that data and clock inputs has lost bit synchronization and the latch timing pulse is approaching a critical point, i.e., a data transition point. Normally, the clock signal is applied from a clock input terminal to the latches as the latch timing signal. When a mismatch is detected, the phase of the latch timing signal is reversed to shift the latch timing to a point where the data signal has a steady logic level.

According to a further aspect, bit synchronization between multiple data signals and a clock signal can be achieved. The clock signal has a frequency higher than the repetition frequency of each of the data signals by an integer M which is greater than unity. The clock signal is divided in frequency by a divide-by-M counter. A plurality of bit synchronizers are provided for respectively receiving the data signals. Each bit synchronizer comprises a plurality of latches for respectively latching the received data signal in response to a latch timing signal to produce an output signal of the bit synchronizer from one of the latches, a mismatch detector for detecting a mismatch between output signals of the latches, and a phase reversal circuit for applying the clock signal from the divide-by-M counter to the latches as the latch timing signal and reversing the phase of the latch timing signal in response to the detection of the mismatch. A retiming circuit latches the output signals of the bit synchronizers in response to the clock signal from the divide-by-M counter means. A delay circuit is provided for introducing a delay to the clock signal supplied from the divide-by-M counter to the retiming circuit so that it coincides with a steady logic level of each of the output signals of the bit synchronizers.

BRIEF DESCRIPTION OF THE DRAWINGS

The present invention will be described in further detail with reference to the accompanying drawings, in which:

FIGS. 11A and 11B are timing diagrams associated with the embodiment of FIG. 10;

DETAILED DESCRIPTION

Figure 3:
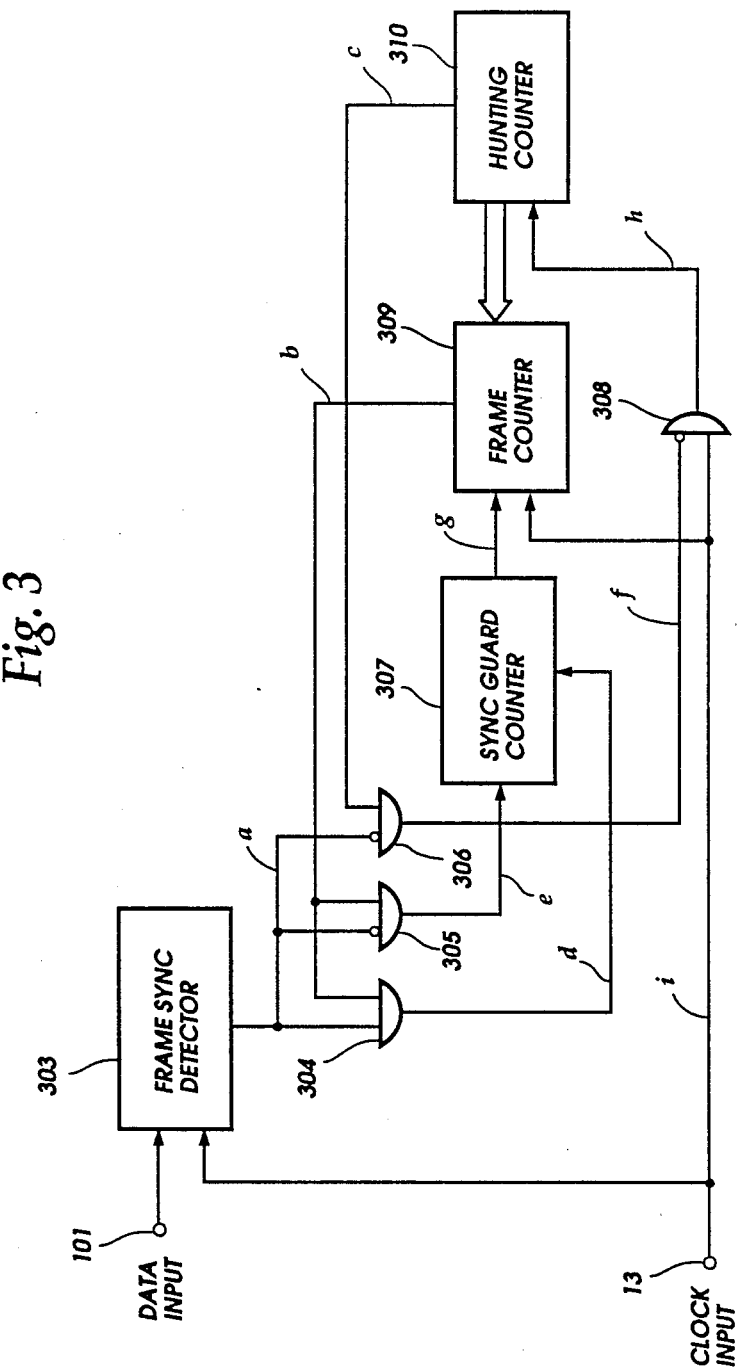
FIG. 3 is a block diagram of a frame synchronizer according to an embodiment of the present invention.

Referring now to FIG. 3, there is shown a frame synchronizer constructed according to a first embodiment of the present invention. The frame synchronizer comprises a frame sync detector 303 for detecting a frame sync pattern from a data bit stream received at terminal 301 and supplying a logic-1 output (indicated by a waveform a in FIG. 4) to a coincidence gate 304 and noncoincidence gates 305 and 306. Frame counter 309 counts clock pulses received directly from terminal 302 and supplies a logic-1 output (indicated by a waveform b in FIG. 4) to the gates 304 and 305 at frame intervals so that it coincides with the logic-1 output of sync detector 303 when data and clock inputs are synchronized, producing a logic 1 (waveform d in FIG. 4) at the output of coincidence gate 304 and a logic 0 (indicated by a waveform e in FIG. 4) at the outputs of noncoincidence gate 305. A clock control gate 308 passes input clock (waveform i) from terminal 302 to a hunting counter 310, which counts clock pulses (waveform h) and supplies a logic-1 output (waveform c) at frame intervals to the noncoincidence gate 306 as long as it is driven by clock pulses (waveform h) and stops the clock counting during a hunting mode. A sync guard counter 307 is responsive to the logic-1 output (waveform d) from coincidence gate 304 to reset its internal state and has three forward count stages (N=3), for example, to supply a load enable pulse (waveform g) to frame counter 309 at the count of N logic-1 outputs from noncoincidence gate 305 to cause a binary count value to be loaded into frame counter 309 from hunting counter 310.

Figure 4:
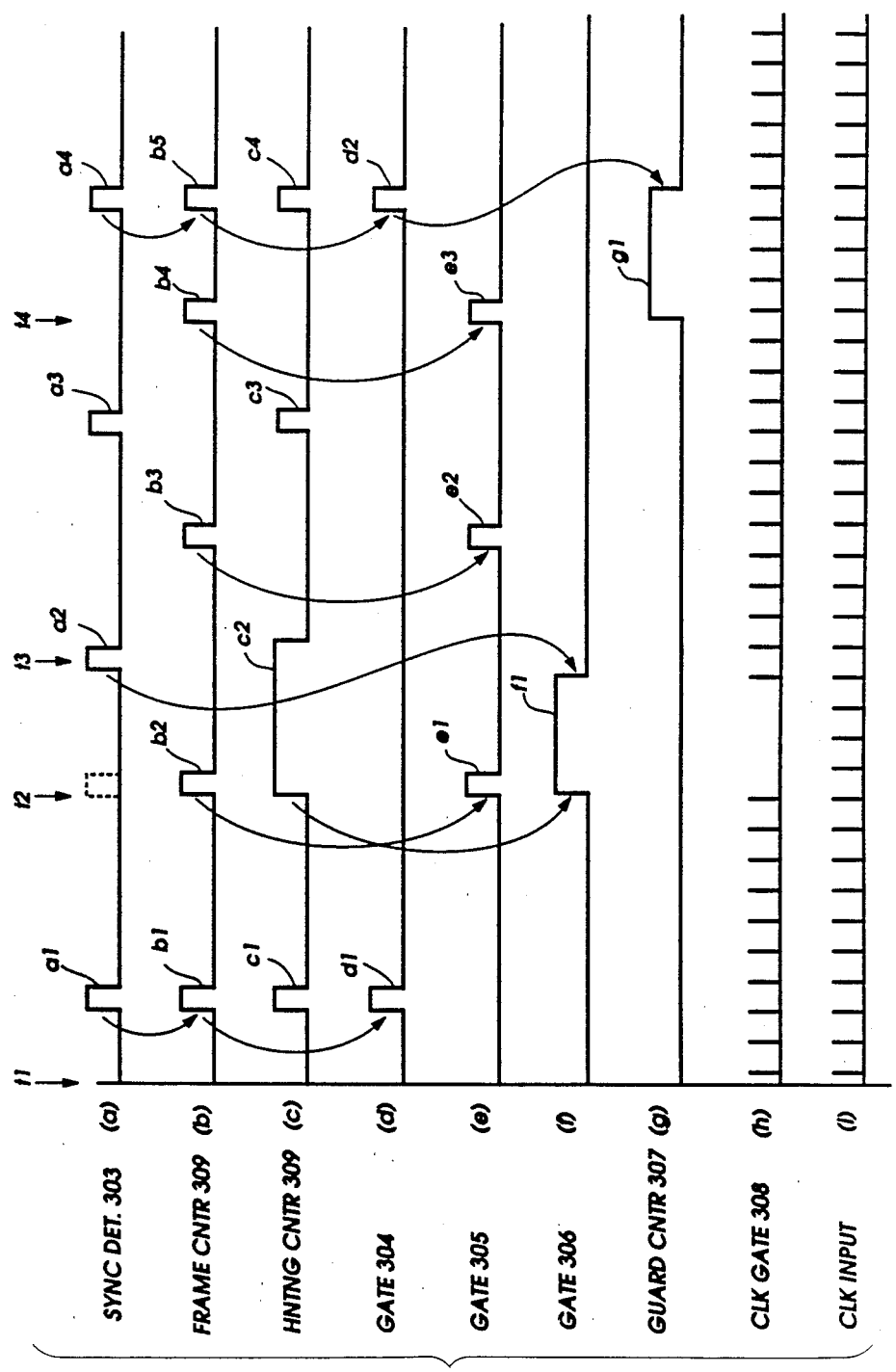
FIG. 4 is a timing diagram associated with the embodiment of FIG. 3.

When data and clock inputs at terminals 301 and 302 are synchronized at time t1, pulses b1 and c1 from counters 309 and 310 occur simultaneously in phase with an output pulse a1 from sync detector 303 as shown in FIG. 4 and a pulse d1 is supplied from gate 304 as a reset pulse to sync guard counter 307 so that its internal state is initialized to zero (N=0). The outputs of gates 305 and 306 are at logic 0, and the clock control control gate 308 is open, allowing the clock input from terminal 302 to be supplied to hunting counter 310.

Assume that data and clock inputs at terminals 301 and 302 lose synchronism at time t2 and a pulse a2, which is expected to appear at time t2, appears at time t3. At time t2, pulses b2 and c2 are generated by counters 309 and 310, respectively, and the output of coincidence gate 304 switches to logic 0. Noncoincidence gates 305 and 306 respectively produce pulses e1 and f1. In response to the pulse e1, sync guard counter 307 is incremented to $N=1$ and in response to the pulse f1, clock control gate 308 is disabled to freeze the the hunting counter 310. Frame counter 309 is continuously supplied with clock to increment its count in response to the clock input (waveform i), and the synchronizer enters a hunting mode and the binary count of hunting counter 310 which has been attained at time t2 is maintained. When the frame sync detector 303 detects a frame pattern at time t3, the output of noncoincidence gate 306 changes to logic 0, allowing the clock control gate 308 to pass clock input to the hunting counter 310 to cause to resume the clock counting. Thereafter, pulses a3, c3, a4 and c4 occur synchronously in succession and sync guard counter 307 is successively incremented in response to pulses e2 and e3 from noncoincidence gate 305 which are generated respectively in response to pulses b3 and b4 from the frame counter 309.

Figure 1:
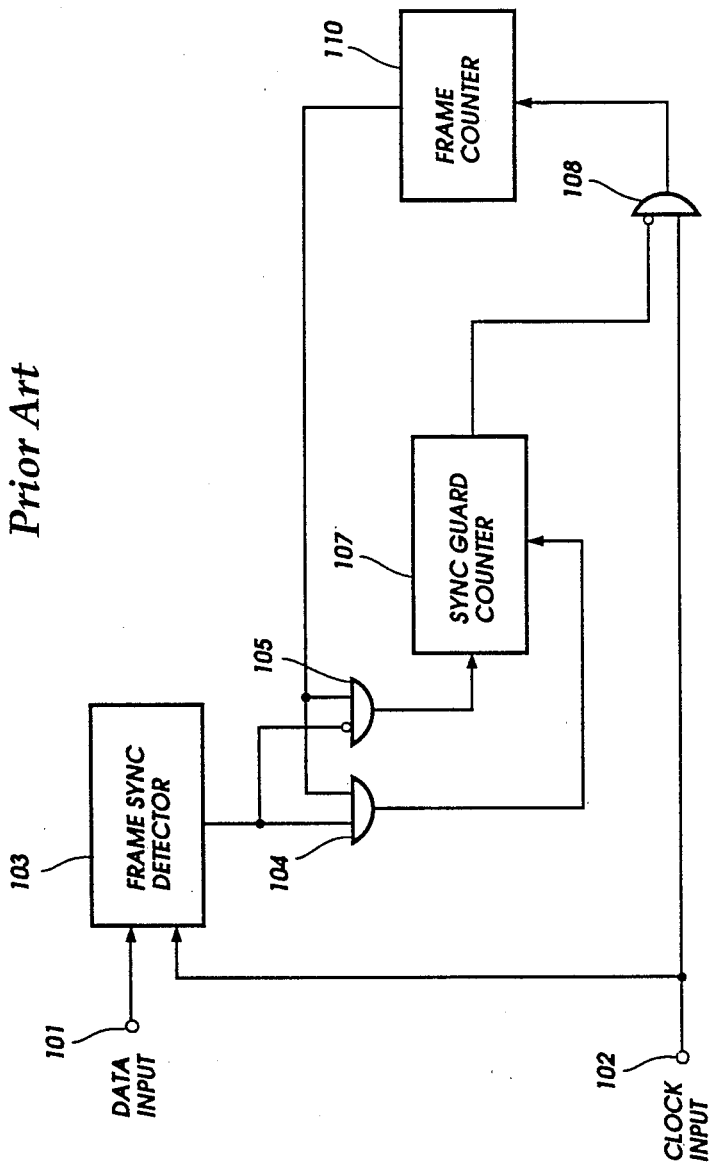
FIG. 1 is a block diagram of a prior art frame synchronizer.
Figure 2:
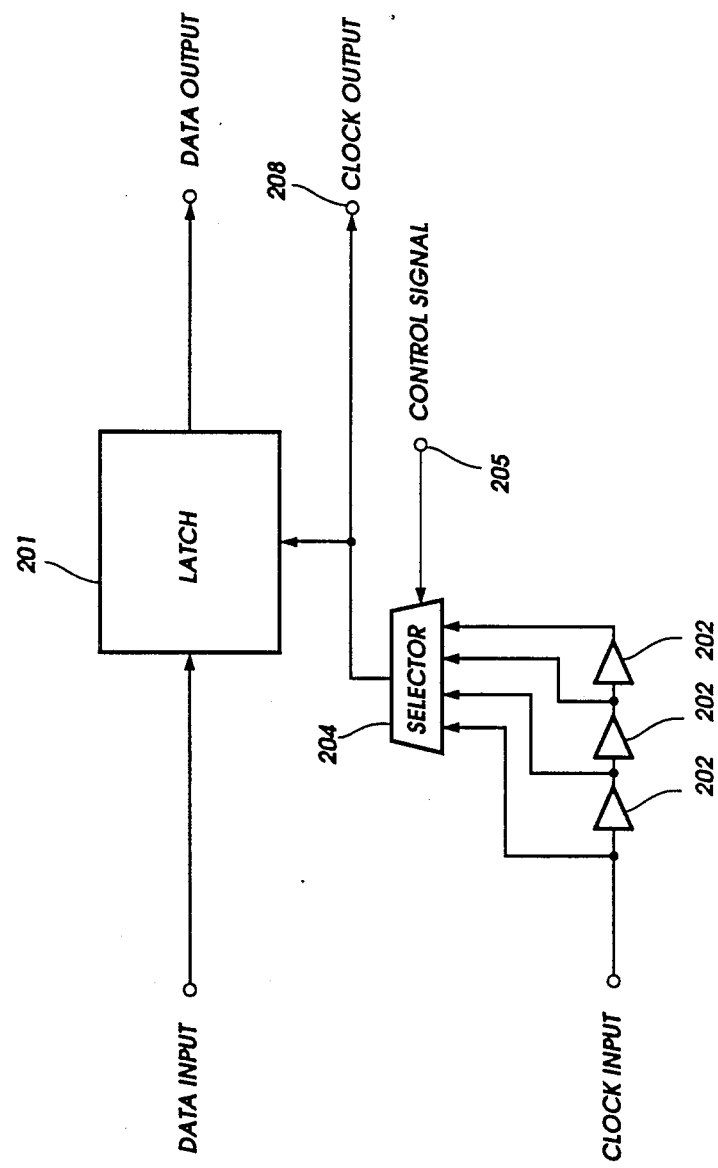
FIG. 2 is a block diagram of a prior art bit synchronizer.

Therefore, the internal state of sync guard counter 307 is incremented to $N=3$ at time t4 and a load enable pulse g1 is supplied therefrom to the frame counter 309 to cause the binary count value of the hunting counter 310 to be loaded into the frame counter 309. As a result, frame counter 309 produces a pulse b5 synchronously with the pulse c4 of the hunting counter 310, causing a pulse d2 from coincidence gate 304 to reset the sync guard counter 307. It is seen therefore that the updating of frame counter 309 with the binary count of hunting counter 310 compensates for the delay interval between times t2 and t3 and shortens the time required for frame counter 309 to produce a logic-1 output after the confirmation of resynchronization for N successive frames. In comparison with the prior art of FIG. 1, the time taken for the frame counter 309 to hunt for sync timing can be reduced to substantially zero. Because of the reduced hunting period, the frame synchronizer of the present invention is not dependent on the frame bit pattern and allows the use of frame sync detectors as shown in FIGS. 5 and 6.

Figure 5:
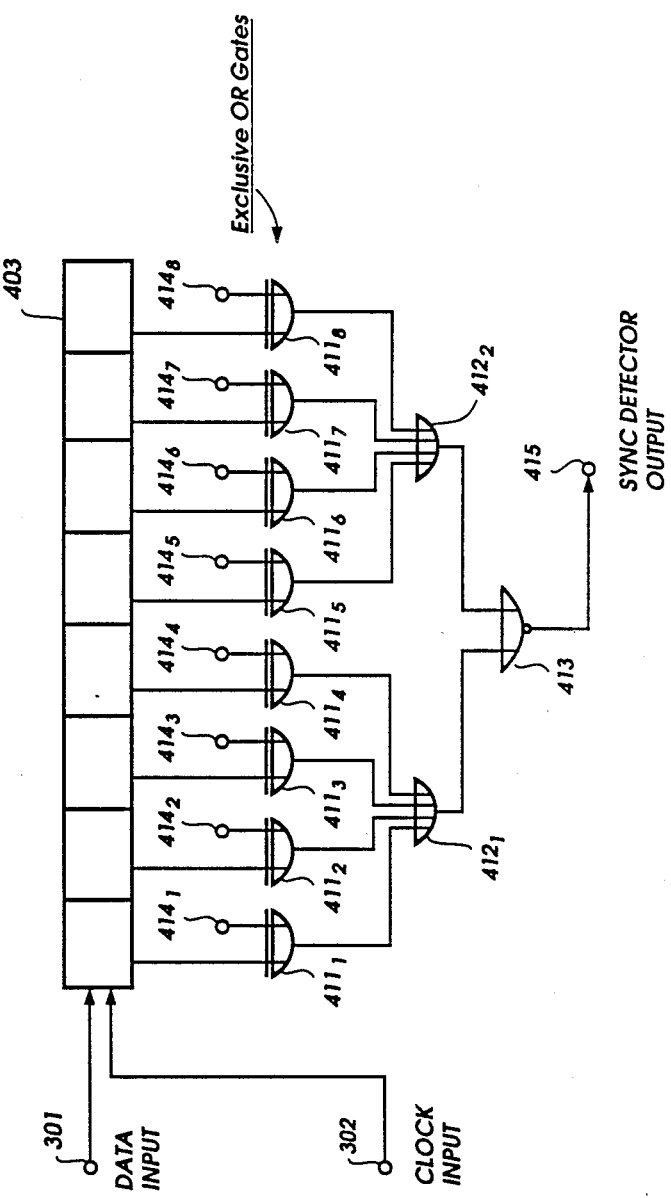
FIGS. 5 and 6 are circuit diagrams of frame sync detectors which can be used in the present invention.
Figure 6:
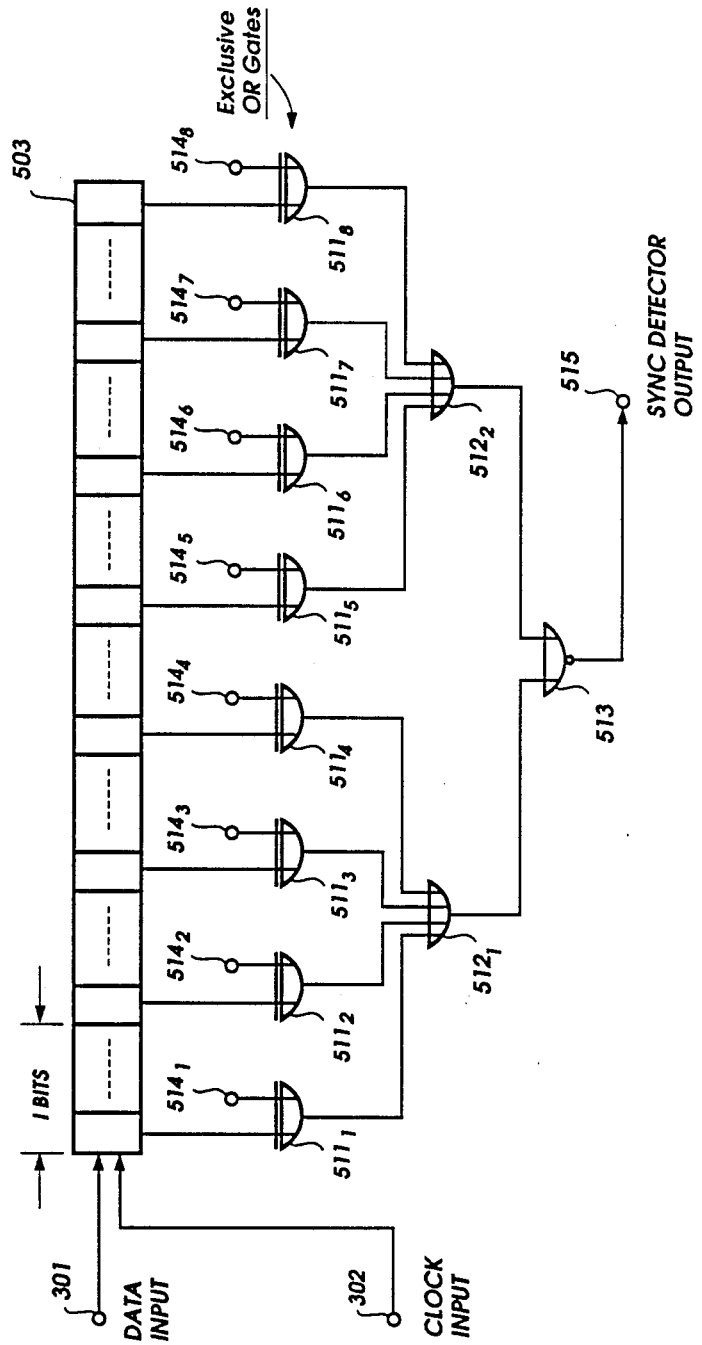

The frame sync detector of FIG. 5 is one that detects a frame sync pattern of a consecutive 8 bits and includes an 8-bit shift register 403 which is clocked by the clock input from terminal 302 to shift data bits on terminal 301 along its stages, which are respectively connected to exclusive-OR gates $411_1$ to $411_8$ to which reference bits indicating the frame bit pattern are supplied from terminals $414_1$ to $414_8$. The outputs of exclusive-OR gates $411_1$ to $411_4$ are connected through an OR gate $412_1$ to a NOR gate 413 whose output is coupled to an output terminal 415 and the outputs of exclusive-OR gates $411_5$ to $411_8$ are connected through an OR gate $412_2$ to the NOR gate 413. When coincidence occurs between each reference bit and a corresponding bit from shift register 403, a logic-1 output appears at the output terminal 415 as an indication that a frame sync having the desired bit pattern is detected. In FIG. 6, the shift register 503 has a frame length which is equal to $(I \times 8)$-bit long. Frame bit pattern is bit interleaved at I-bit intervals with data bits. Those of the stages of shift register 503 which are spaced I-bit intervals are respectively connected to exclusive-OR gates $511_1$ to $511_8$ to which reference bits are supplied from terminals $514_1$ to $514_8$. The outputs of exclusive-OR gates $511_1$ to $511_4$ are supplied through an OR gate $512_1$ to a NOR gate 513 whose output is coupled to an output terminal 515 and the outputs of exclusive-OR gates $511_5$ to $511_8$ are supplied through an OR gate $512_2$ to the NOR gate 513. When match occurs between the received bit pattern and the pattern established by the exclusive-OR gates 511, a logic 1 output appears at the output terminal 515 as an indication of the detection of a desired frame pattern.

Figure 7:
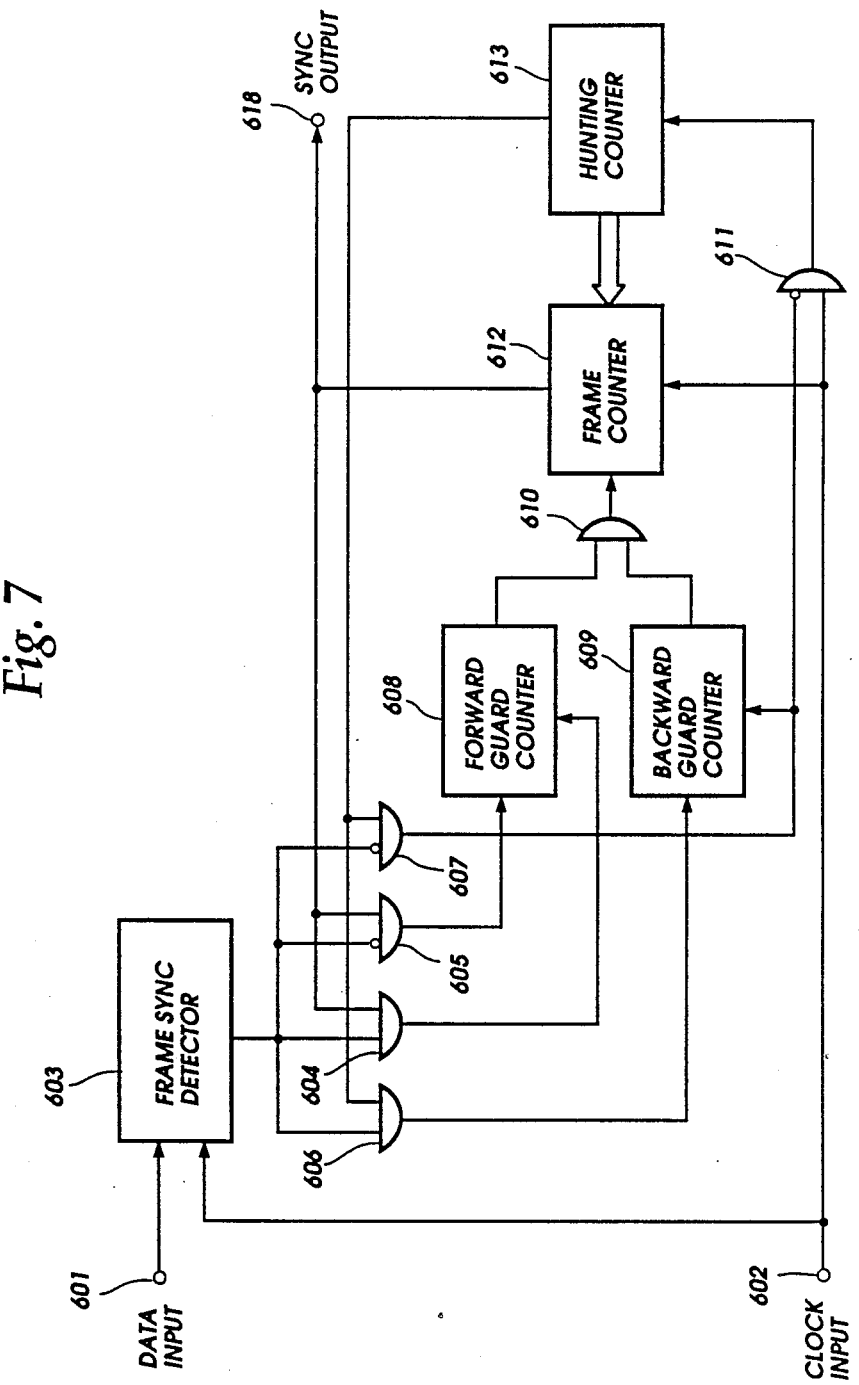
FIG. 7 is a block diagram of a frame synchronizer according to a modified embodiment.

A frame synchronizer according to a second embodiment of the invention is shown in FIG. 7. Frame sync detector 603 similar to detector 303 of the previous embodiment is clocked with pulses from clock terminal 602 to detect a frame sync pattern from input data which appears at data terminal 601 and, upon detection of a sync pattern, supplies a logic-1 output to a coincidence gate 604 and a noncoincidence gate 605 whose outputs are respectively connected to the reset and count inputs of a forward guard counter 608 having N counter stages and to a coincidence gate 606 and a noncoincidence gate 607 whose outputs are respectively coupled to the count and reset inputs of a backward guard counter 609 having M counter stages. The outputs of counters 608 and 609 are fed to an AND gate 610 whose output is coupled to a load enable input of a frame counter 612. Frame counter 612 supplies a logic-1 output at frame intervals to the coincidence gate 604 and noncoincidence gate 605, and further to a frame sync output terminal 618. Clock pulses from terminal 602 are applied to the count input of frame counter 612 and to a clock control gate 611 which opens in the presence of a logic-0 output from the noncoincidence gate 607. The output of clock control gate 611 is applied to the count input of a hunting counter 613, which in turn supplies a logic-1 output at frame intervals to the coincidence gate 606 and noncoincidence gate 607. The binary count of hunting counter 613 is loaded into the frame counter 612 in response to a load enable pulse from the AND gate 610.

When data and clock inputs are synchronized, the binary counts of both frame counter 612 and hunting counter 613 are the same so that their outputs occur simultaneously at frame intervals, and logic 1 appears at the outputs of coincidence gates 604 and 606 and logic 0 appears at the outputs of noncoincidence gates 605 and 607. Therefore, the forward guard counter 608 is reset at frame intervals, generating a logic-0 output which disables the AND gate 610 and the backward guard counter 609 is incremented, producing a logic-1 output. Under this condition the frame synchronizer is said to be in a "forward guard mode". This condition is terminated when the forward guard counter 608 is successively incremented to a count of N in response to logic-1 outputs from the noncoincidence gate 605.

Assume that data and clock inputs begin to lose synchronism, the outputs of coincidence gates 604 and 606 change to logic 0 and the outputs of noncoincidence gates 605 and 608 switch to logic 1. The logic-1 output of gate 605 is counted by forward guard counter 608 and the logic-1 output of gate 608 resets the backward guard counter 609 and closes the clock gate 611, so that hunting counter 613 stops counting until the frame sync detector 603 produces a logic-1 output. Under this condition, the frame synchronizer is said to be in a hunting mode seeking a frame sync pattern. When a frame sync pattern is detected by sync detector 603, the output of noncoincidence gate 607 switches to logic 0, opening the clock gate 611. Hunting counter 613 resumes clock count operation. Simultaneously, the output of coincidence gate 606 switches to logic 1, which is counted by the backward guard counter 609, causing the frame synchronizer to enter a "backward guard mode".

Meanwhile, the forward guard counter 608 has been incremented to N, enabling the AND gate 610. When the backward guard counter 609 is incremented to M, a logic-1 output is supplied from the AND gate 610 as a load enable pulse to the frame counter 612, so that the binary count of hunting counter 613 is loaded into the frame counter 612.

Figure 8:
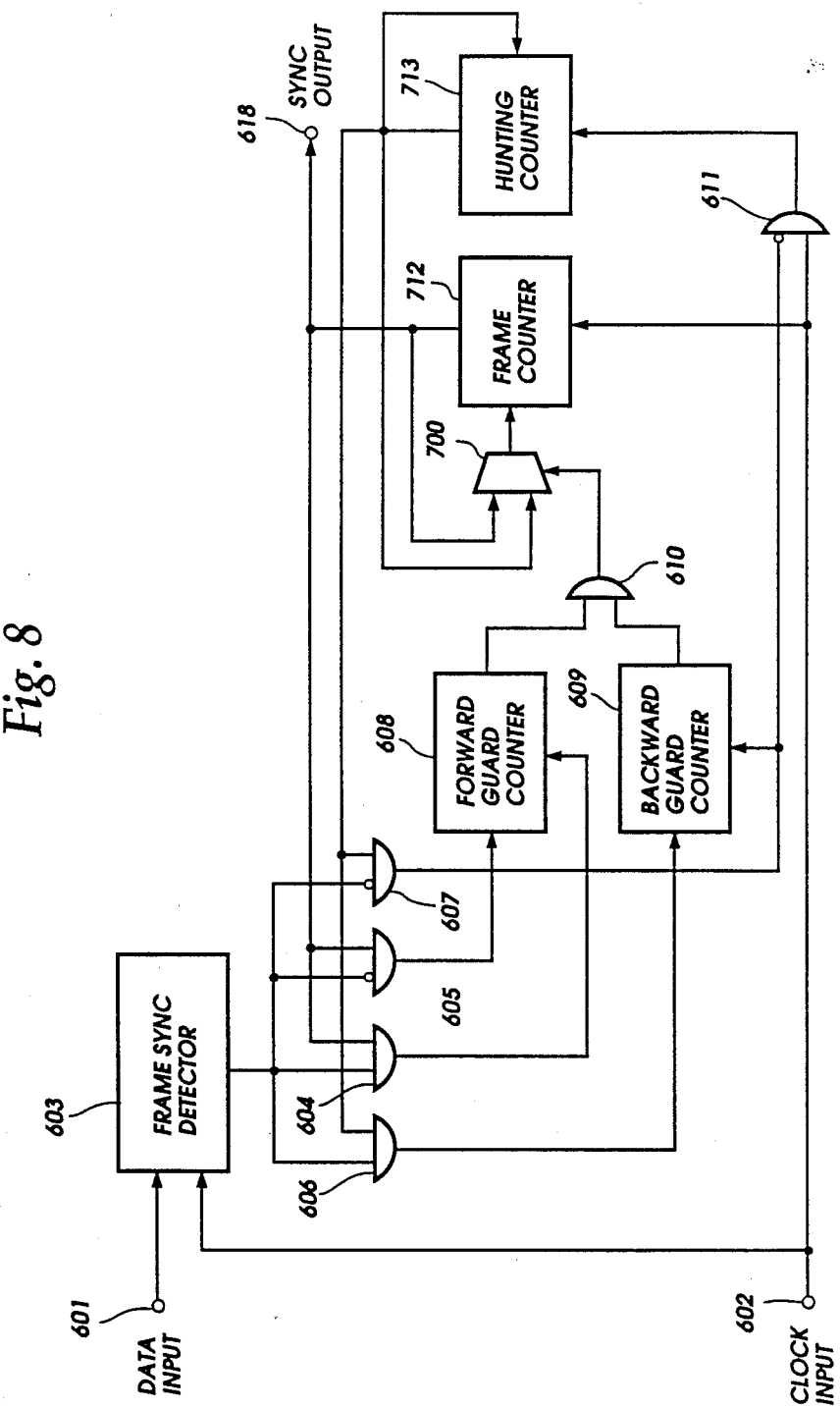
FIG. 8 is a block diagram of a frame synchronizer according to a further modification of the present invention.

A modified form of the embodiment of FIG. 7 is shown in FIG. 8. In this modification, the frame counter 612 and hunting counter 613 of the previous embodiment are replaced with a frame counter 712 and a hunting counter 713, and a selector 700 is provided to selectively apply logic-1 outputs from these counters to the reset input of frame counter 712 in accordance with the logic states of the output of AND gate 610. During synchronous conditions, the output of AND gate 610 is at logic 0, which causes the selector 700 to establish a connection between the output of frame counter 712 to its reset input. As a result, frame counter 712 is initialized at frame intervals. During an asynchronous state, the output of AND gate 610 switches to logic 1 and causes the selector 700 to establish a connection between the output of hunting counter 713 to the reset input of frame counter 712. As a result, the frame counter 712 is initialized simultaneously with the hunting counter 713 to quickly restore the binary state of frame counter 712.

Figure 9:
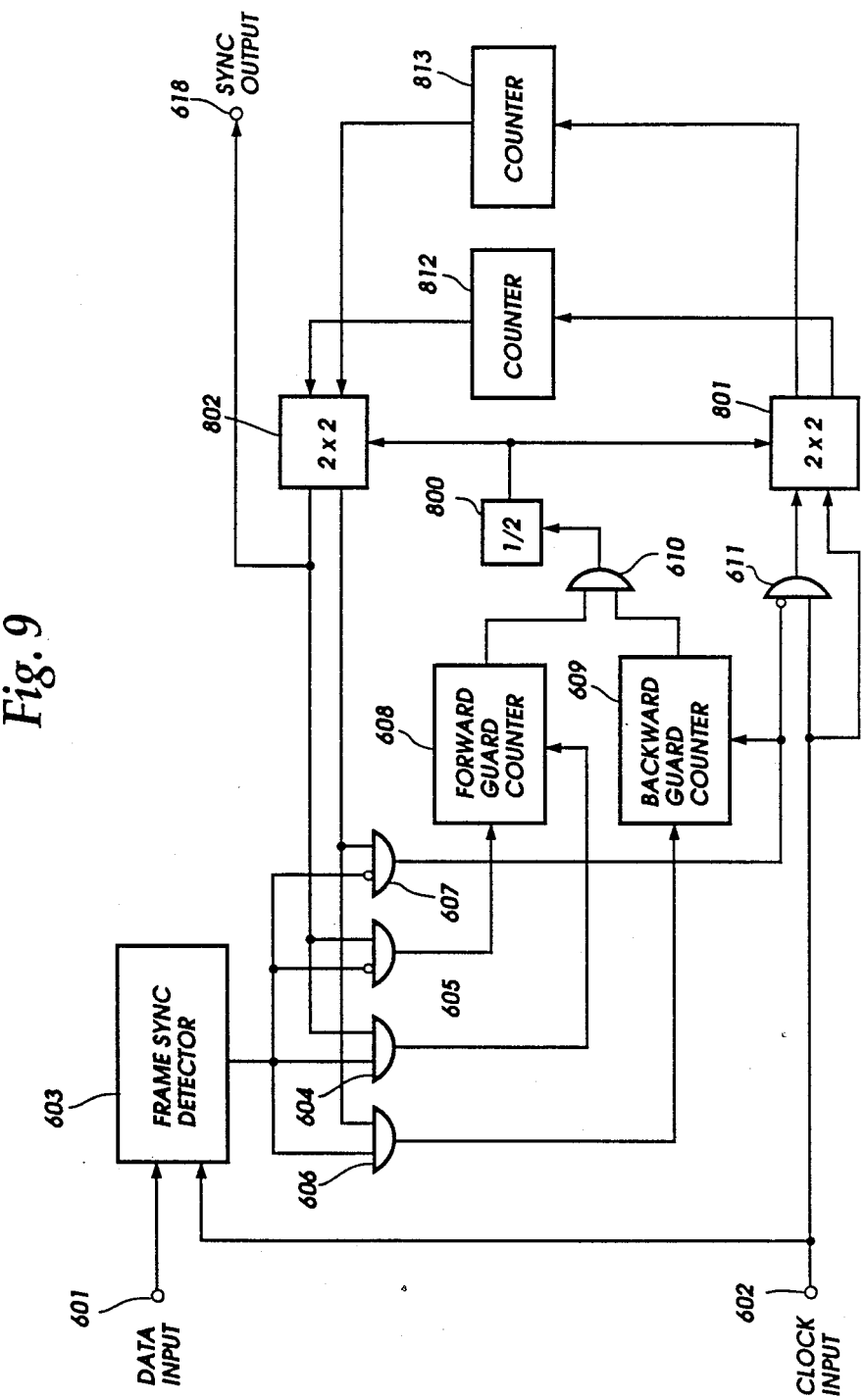
FIG. 9 is a block diagram of a frame synchronizer according to a still further modification of the invention.

An embodiment shown in FIG. 9 is a modification of the embodiment of FIG. 8. In this embodiment, counters 812 and 813 are arranged to operate as frame and hunting counters and interchange their functions at twice the intervals at which the output of AND gate 610 changes. A divide-by-2 counter 800 is connected to the output of AND gate 610 to supply a switching control signal to 2×2 switches 801 and 802. In accordance with the logic states of the switching signal switch 801 selectively establishes connections between the output of control gate 611 and the input clock terminal 602 on the one hand and the inputs of counters 812 and 813 on the other, and switch 802 selectively establishes connections between the outputs of these counters on the one hand and the inputs of gates 604, 605, 606 and 607 on the other. If the switching signal from divide-by-2 counter 800 is at logic 0, the output of clock gate 611 is coupled through switch 801 to counter 813 to operate it as a hunting counter and the clock input terminal 602 is coupled via the switch 801 to counter 812 to operate it as a frame counter.

The output of counter 813 is coupled through switch 802 to gates 606 and 607, the output of counter 812 being coupled through it to gates 604 and 605. When the switching signal changes to logic 1, the output of clock gate 611 is switched to counter 812 to operate it as a hunting counter and the clock input terminal 602 is switched to counter 813 to operate it as a frame counter. The output of counter 813 is switched to gates 604 and 605 and the output of counter 812 is switched to gates 606 and 607. Therefore, counters 812 and 813 interchange their functions at the instant the output of AND gate 610 changes from "0" to "1". One of these counters which has been functioning as a hunting counter begins to supply its output to those coincidence and noncoincidence gates which are connected to the forward guard counter 608, and the other counter which has been operating as a frame counter begins to supply its output to the other gates which are connected to the backward guard counter 609.

Figure 10:
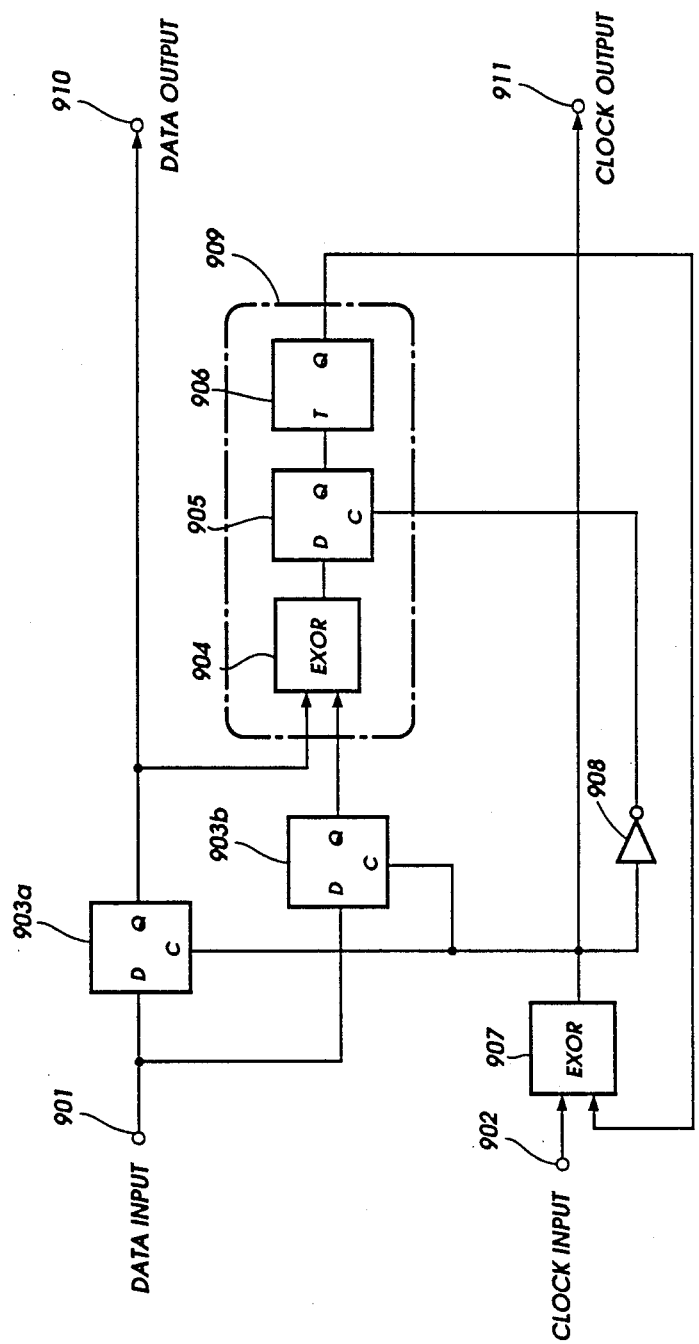
FIG. 10 is a circuit diagram of a bit synchronizer of the present invention.

According to a second aspect of the present invention, a bit synchronizer is shown in FIG. 10. An incoming data signal at terminal 901 is applied to the date inputs of D flip-flops 903a and 903b, which serve as data latches, and a clock signal at terminal 902 is applied to one input of an exclusive-OR gate 907. The output of exclusive-OR gate 907 is supplied to the clock inputs of D flip-flops 903a and 903b as a latch timing pulse. The outputs of D flip-flops 903a and 903b are applied to an exclusive-OR gate 904 which forms part of a coincidence detector 909. The output of exclusive-OR gate 904 is applied to the data input of a D flip-flop 905 whose output is coupled to a T flip-flop 906. The output of T flip-flop 906 is supplied as an output of the coincidence detector 909 to exclusive-OR gate 907, or phase reversal means, to change the phase of the latch timing pulse between 0 and $\pi$ phase with respect to the timing of the clock input received at terminal 902. The output of exclusive-OR gate 907 is further applied to a clock output terminal 911 on the one hand and is applied, on the other, to an inverter 908 and thence to the clock input of D flip-flop 905. The output of D flip-flop 903a is coupled to a data output terminal 910 to deliver a resynchronized data signal.

Figure 11B:
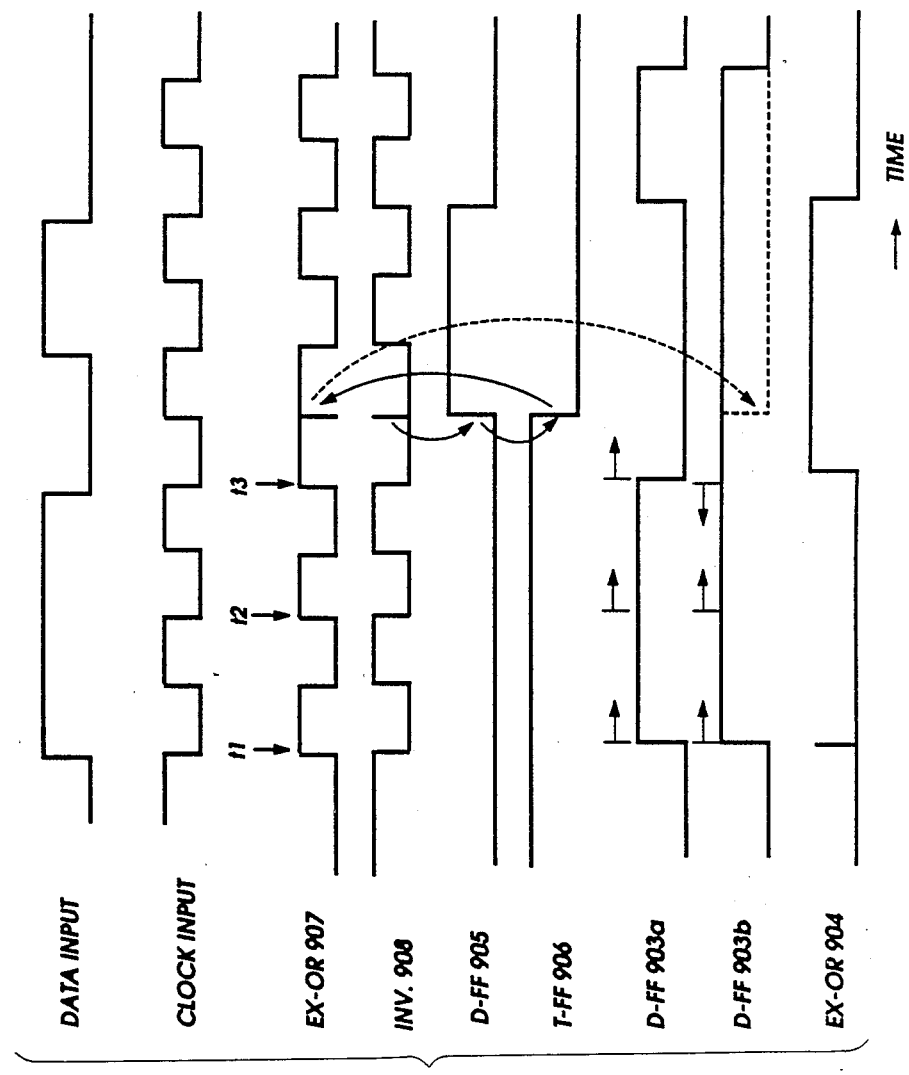

The operation of the bit synchronizer of FIG. 10 will be better understood with reference to FIG. 11A in which delay times associated with the circuit components are taken into account and further reference to FIG. 11B in which delay times are not taken into account. In FIGS. 11A and 11B, rightward-pointing arrows indicate that the transition points of data input at terminal 901 are earlier than the rising edges of the output of exclusive-OR gate 907 and a leftward-pointing arrow indicates that a data transition point is later than the rising timing of an output pulse of the exclusive-OR gate 907.

If the output of T flip-flop 906 is initially at logic 1, the output of exclusive-OR gate 907 is a series of pulses whose timing is shifted by $\pi$ phase with respect to the timing of the clock input at terminal 902. Each of the D flip-flops 903a and 903b is clocked in response to the rising edge of the output of exclusive-OR gate 907 at times t1, t2, and t3 and so on to effect the discrimination of the incoming data between binary logic levels.

Under optimum conditions, the rising edge of the output of exclusive-OR gate 907 is coincident with a steady logic level of the data signal as will be understood as the description proceeds. Due to different delays between the data and clock inputs, the rising edge of the output of exclusive-OR gate 907 becomes misaligned with the data input and eventually approaches a data transition point. When this occurs, the outputs of D flip-flops 903a and 903b become indefinite and outputs of different logic levels result.

In FIG. 11A, it is assumed that at time t3 a data transition point approaches the rising edge of an output pulse from exclusive-OR gate 907 and the D flip-flop 903a switches to logic-0 level following the data transition, while D flip-flop 903b remains at logic-1 level due to delays associated with data and clock input lines and logic gates and the variabilities between their pulse responses. Exclusive-OR gate 904 thus produces a logic-1 output. Insignificant logic-1 output pulses tend to develop in the form of narrow spikes at the output of exclusive-OR gate 904 when the rising and falling edges of the outputs of D flip-flops 903a and 903b are close to each other. D flip-flop 905 is clocked with the output of inverter 908. This eliminates the insignificant spikes and extracts a valid output from exclusive-OR gate 904. T flip-flop 906 responds to the output of D flip-flop 905 by switching its output to logic 0. The switching of the logic state of T flip-flop 906 causes the logic state at the output of exclusive-OR gate 907 to change.

As a result, the logic-0 output of T flip-flop 909 switches the output of exclusive-OR gate 907 to change to logic 1, producing a pulse as shown at "A" in FIG. 11A at the output of exclusive-OR gate 907. In response to the rising edge of the pulse "A", D flip-flop 903b switches to logic 0. Therefore, the latch timing pulse to D flip-flops 903a and 903b is shifted to a point where the logic level of the incoming data can be clearly discriminated. Once a logic (phase) reversal occurs at the output of exclusive-OR gate 907, succeeding latch timing pulses coincide with a steady logic level of the data input. Bit resynchronization can therefore be established between data and clock outputs at terminals 910 and 911 regardless of the repetition frequency of the data signal.

In FIG. 11B, if the logic level switching at the output of exclusive-OR gate 907 produces a pulse which is too narrow for D flip-flop 903b, the output of this flip-flop will remain at logic-1 level. Otherwise, it switches to logic 0 as indicated by dotted lines so that a data segment at the output of D flip-flop 903b will be stretched by a $\pi$-phase period of the clock input.

Figure 12:
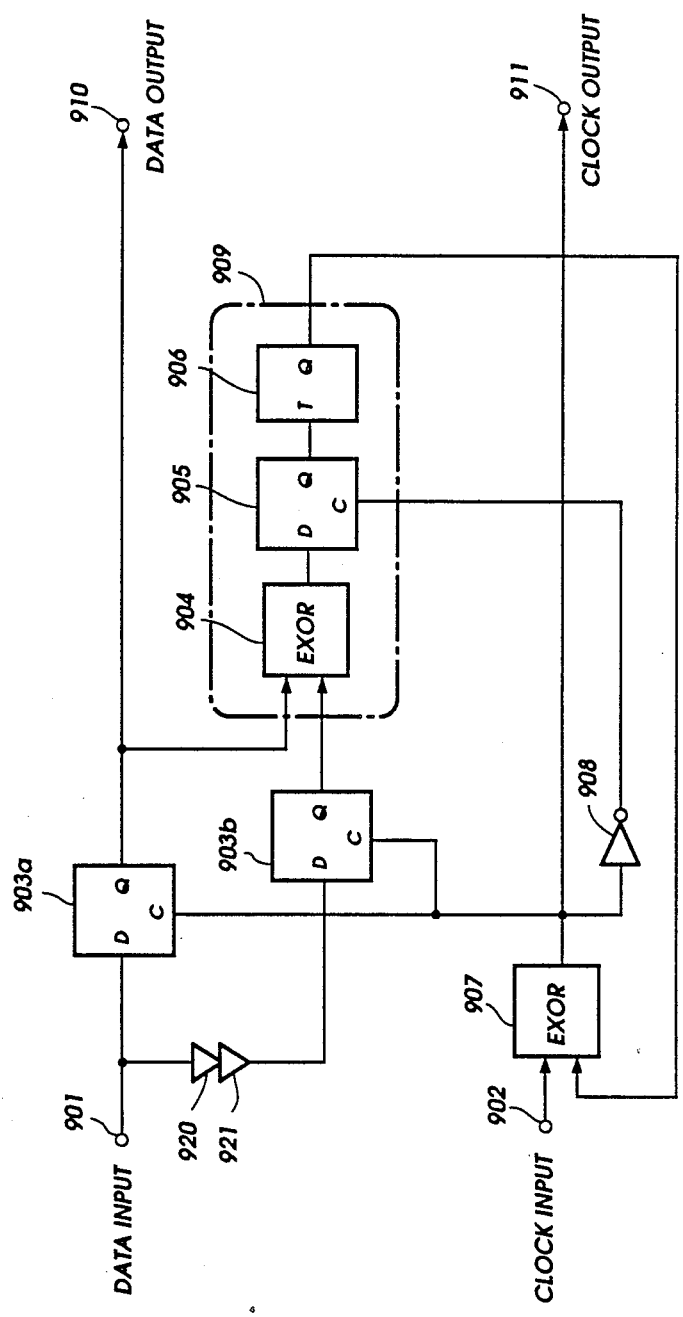
FIGS. 12, 13 and 14 are circuit diagrams of modified forms of the bit synchronizer of FIG. 10.

As illustrated in FIG. 12, the embodiment of FIG. 10 can be modified by connecting a series of delay gates 920 and 921 from the data input terminal 901 and the data input of D flip-flop 903b. The introduction of the delay is to cause exclusive-OR gate 904 to generate a more distinct output pulse when a data transition approaches the clock timing of the D flip-flops 903a and 903b.

Figure 13:
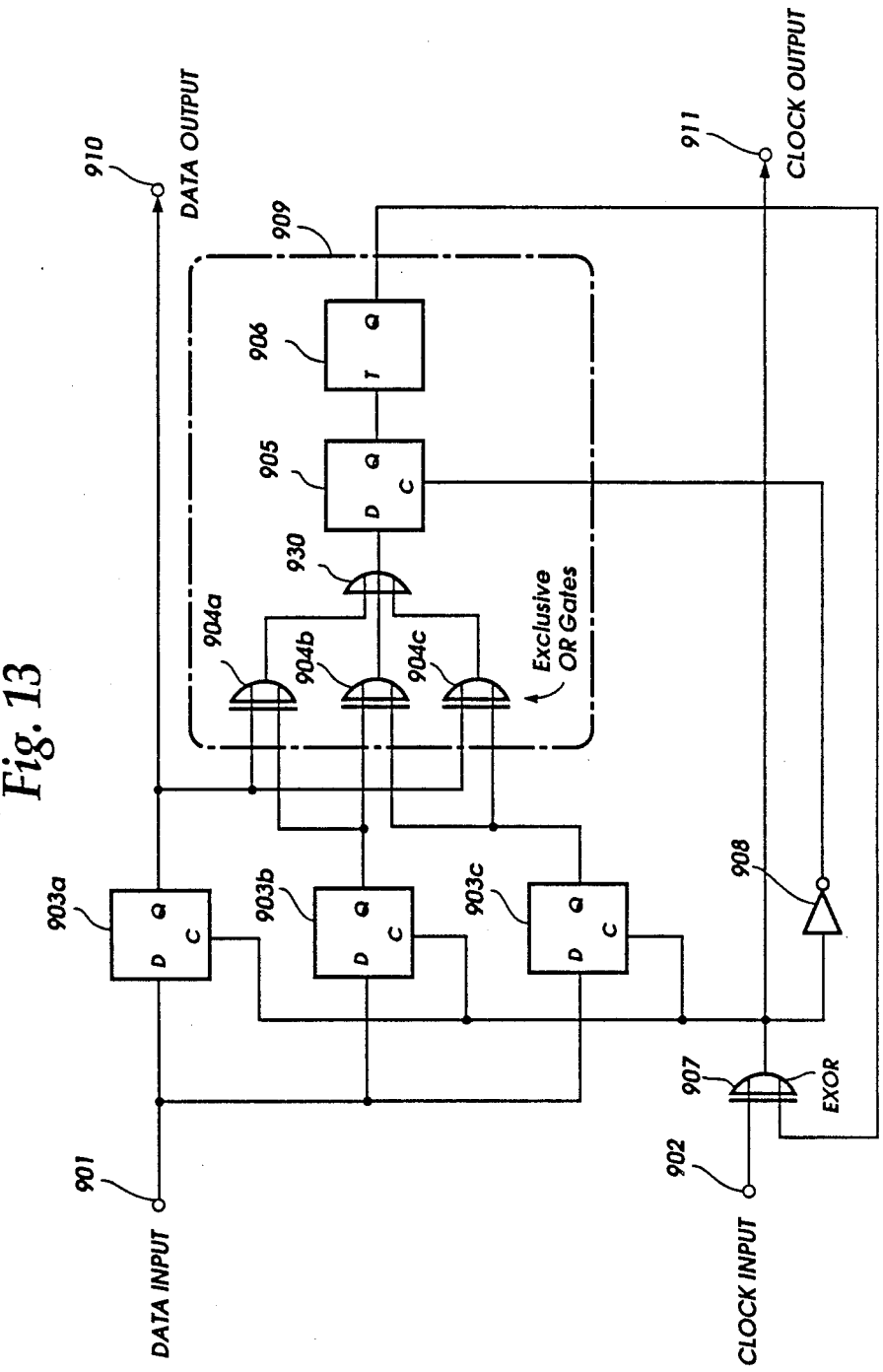

While mention has been made of embodiments in which two D flip-flops are used for latching input data, more than two D flip-flops can be advantageously used in the present invention. FIG. 13 shows a set of three D flip-flops 903a, 903b and 903c whose data inputs are connected together to the data input terminal 901. A like set of exclusive-OR gates 904a, 904b and 904c are provided so that exclusive-OR gate 904a detects mismatch between the outputs of D flip-flops 903a and 903b, exclusive-OR gate 904b detects mismatch between the outputs of D flip-flops 903b and 903c and exclusive-OR gate 904c detects mismatch between the outputs of D flip-flops 903a and 903c. The outputs of exclusive-OR gates 904a, 904b and 904c are coupled by way of an OR gate 930 to the data input of spike eliminating D flip-flop 905.

Figure 14:
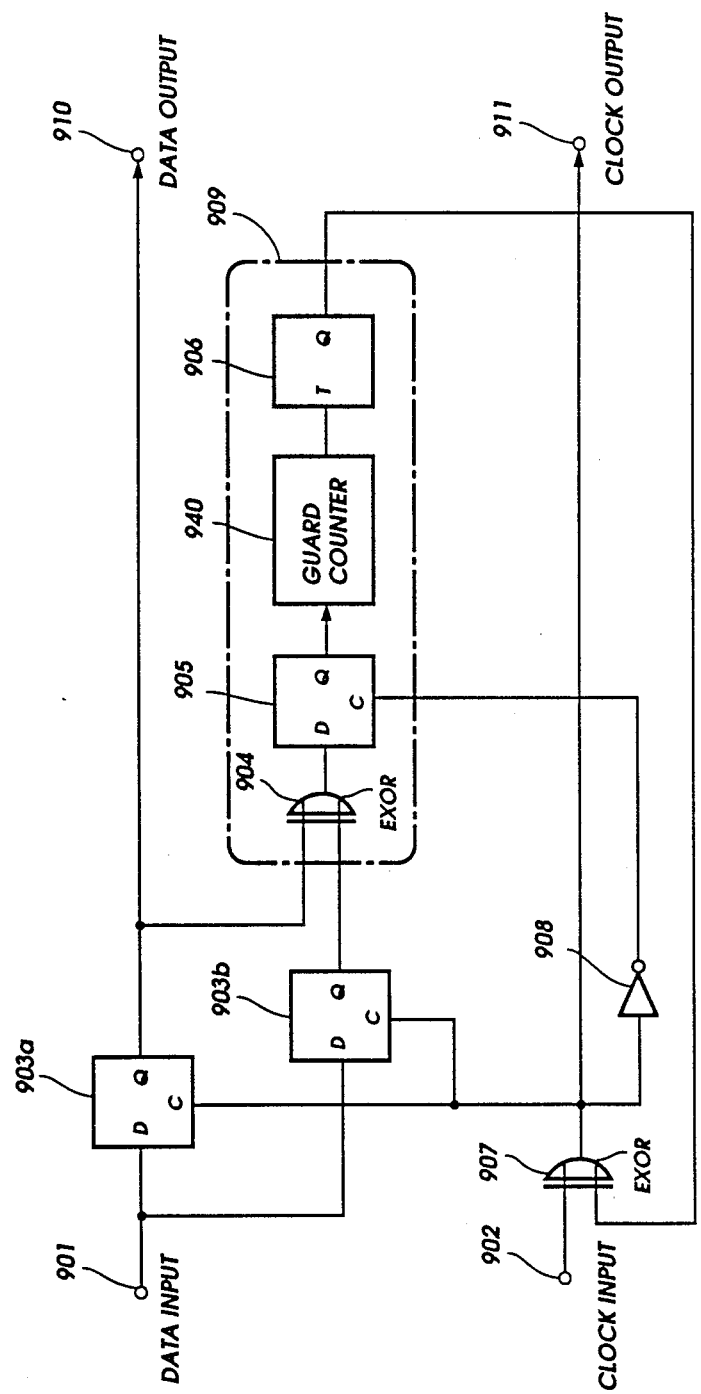

A further modification of the bit synchronizer of FIG. 10 is illustrated in FIG. 14 which differs from the FIG. 10 embodiment by the inclusion of a guard counter 940 between the output of the spike eliminating D flip-flop 905 and the input of T flip-flop 906 to count the output of D flip-flop 905 to produce an output when the mismatch counts exceeds a predetermined value. The purpose of this guard counter is eliminate the adverse effect on exclusive-OR gate 907 caused by possible erratic false operations of D flip-flops 903a and 903b and exclusive-OR gate 904.

Figure 15:
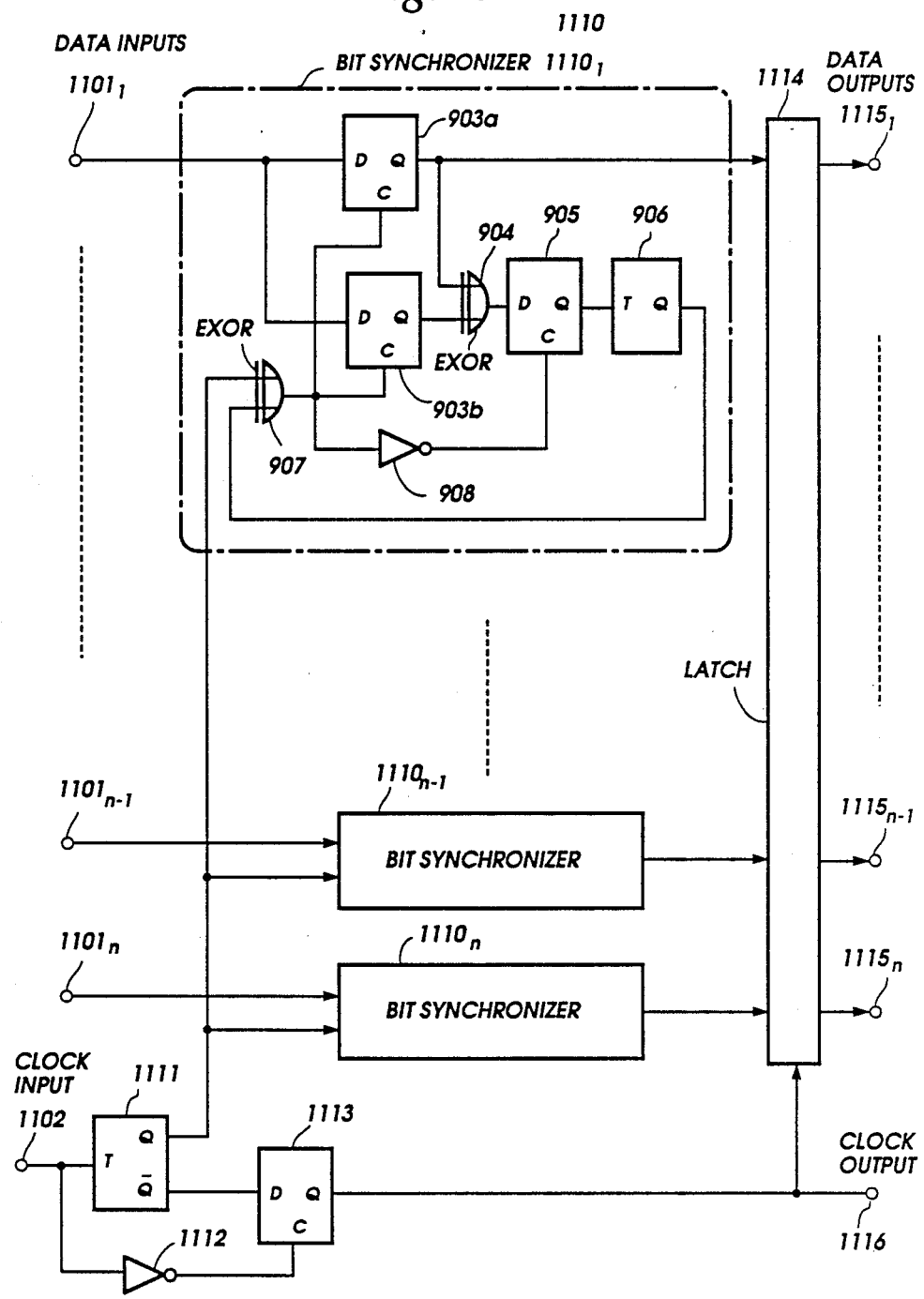
FIG. 15 is a block diagram of another embodiment of the invention in which multiple bit synchronizers are employed to establish bit synchronization between multiple data signals and a clock signal.

The bit synchronizer described above can be advantageously used for aligning bits between multiple data streams as shown in FIG. 15. A plurality of bit synchronizers $1110_l$ to $1110_n$, each of which is identical to that shown in FIG. 10, are connected between data input terminals $1101_l$ to $1101_n$ and the respective inputs of a latch 1114 whose outputs appear at respective data output terminals $1115_l$ to $1115_n$. A clock signal at input terminal 1102 has a repetition frequency which is twice as high as the repetition frequency ($f_0$) of each data bit stream. The T flip-flop 1111 serves as a divide-by-2 counter to divide the clock frequency and supply its Q output as a latch timing pulse to the exclusive-OR gate 907 of each bit synchronizer and its complementary $\overline{Q}$ output to the data input of a D flip-flop 1113. An inverter 1112 is connected to the clock input terminal 1102 to supply its output as a clock input to the D flip-flop 1113. The output of D flip-flop 1113 is applied to a clock output terminal 1116 and further applied as a latch timing pulse to latch 1114 to cause it to latch the outputs of bit synchronizers $1110_l$ to $1110_n$.

Figure 16:
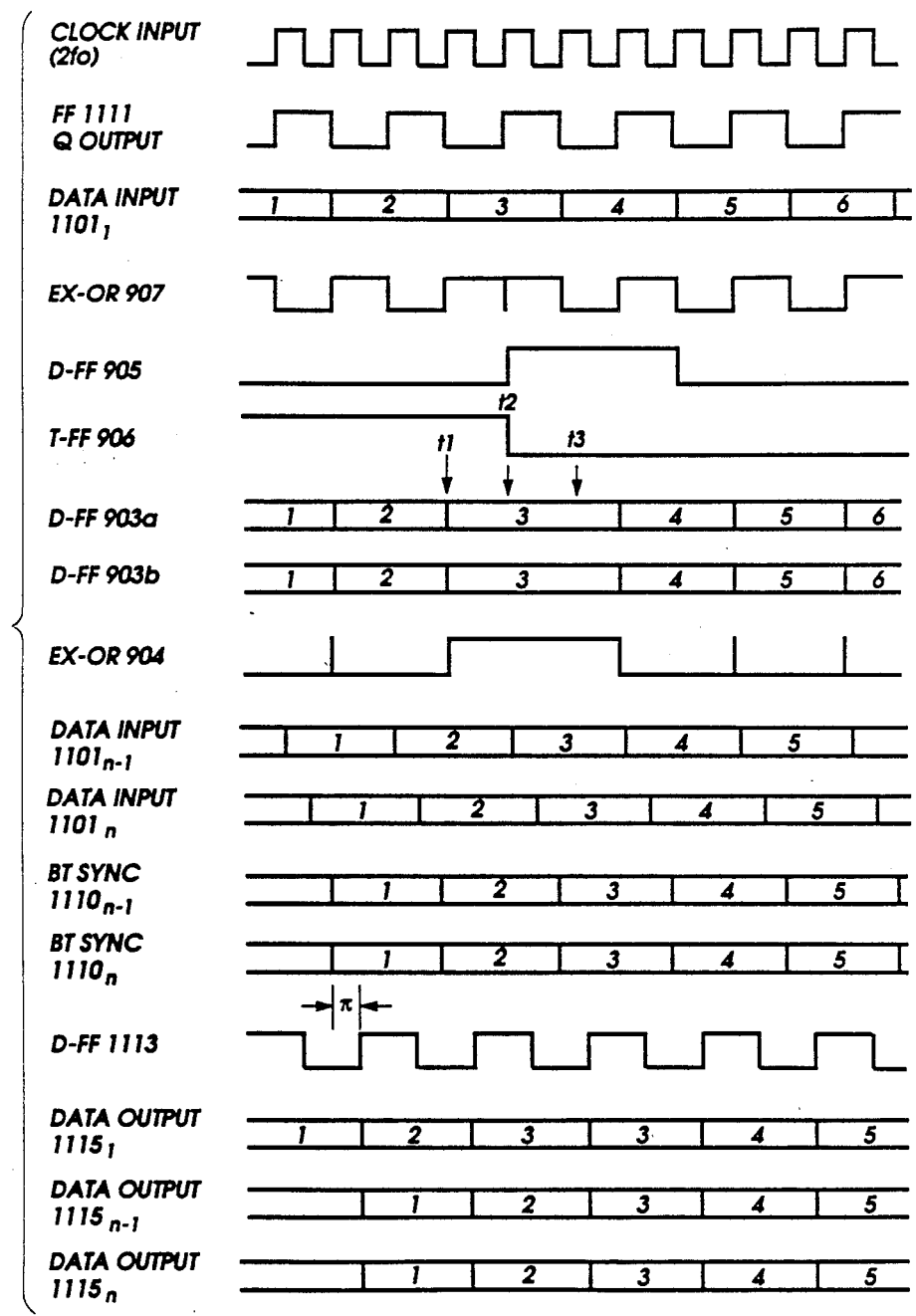
FIG. 16 is a timing diagram associated with the embodiment of FIG. 15.

The operation of the embodiment of FIG. 15 will be better understood with reference to FIG. 16. If the rising edge transition of exclusive-OR gate 907 approaches a data transition between data segments "2" and "3" of data from terminal $1101_l$ at time t1 and a logic reversal occurs at time t2, data segment "3" is latched in D flip-flops 903a and 903b of the bit synchronizer $1110_l$ so that its duration is stretched by a $2\pi$-period of the $2f_0$ clock pulse. Therefore, it is seen that the transitions of all the data streams latched in the bit synchronizers $1110_l$ through $1110_n$ have either 0 or $\pi$ phase. The rising edge of the latch timing pulse developed by D flip-flop 1113 is coincident with timing which is displaced by $\pi$ phase of the clock ($2f_0$) at terminal 1102 with respect to the data transition of any data bit streams. Therefore, data segment "3" of the bit synchronizer $1110_l$ is latched twice in succession as illustrated in FIG. 16 for retiming all data bit streams at time t3.

Figure 17:
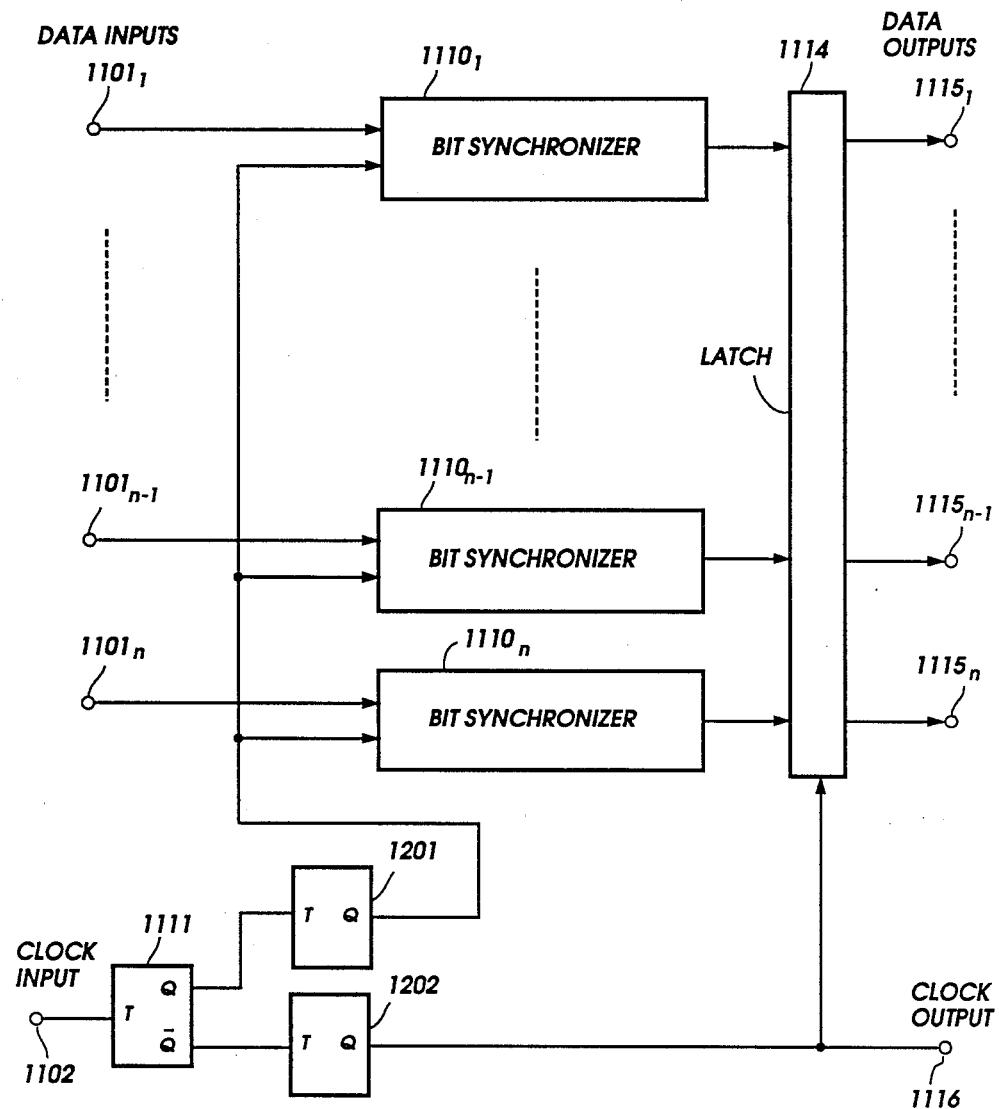
FIG. 17 is a block diagram of a modified form of the embodiment of FIG. 15.

The synchronizer of FIG. 15 can be modified as shown in FIG. 17 in which the clock input at terminal 1102 has a repetition frequency which is four times higher than the repetition frequency of each data input signal. T flip-flops 1201 and 1202 are provided instead of the inverter 1112 and D flip-flop 1113 of the previous embodiment. T flip-flop 1201 takes its input from the Q output of T flip-flop 1111 and applies a latch timing pulse at the data repetition frequency to bit synchronizers $1110_l$ to $1110_n$, and T flip-flop 1202 takes its input from the complementary $\overline{Q}$ output of T flip-flop 1111 and supplies a latch timing pulse at the data repetition frequency to the clock output terminal 1116 and to the latch 1114. The output of each bit synchronizer is either 0- or $\pi$-phase shifted with respect to the respective input data. On the other hand, the output of T flip-flop 1202 is displaced by an amount equal to $2\pi$ phase of the input clock ($4f_0$) with respect to the output of each bit synchronizer.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A synchronizer for establishing synchronization between a data signal and a clock signal, comprising:
frame sync detector means for detecting a frame sync pattern multiplexed with said data signal;
first counter means for continuously incrementing a binary count in response to said clock signal and generating an output signal at frame intervals;
second counter means for incrementing a binary count in response to said clock signal and generating an output signal at frame intervals;
mismatch detector means for detecting a first mismatch between an output signal of said frame sync detector means and the output signal of said first counter means and a second mismatch between the output signal of said frame sync detector means and the output signal of said second counter means;
means for disabling said second counter means in response to the detection of said second mismatch by said mismatch detector means; and
updating means for updating the binary count of said first counter means with the binary count of said second counter means upon detection of said first mismatch by said mismatch detector means.

2. A synchronizer as claimed in claim 1, further comprising match detector means for detecting a match between the output signal of said frame sync detector means and the output signal of said first counter means, wherein said updating means comprises forward guard counter means for incrementing a count in response to the detection of said first mismatch by said mismatch detector means and causing the binary count of said first counter means to be updated with the binary count of said second counter means when said count reaches a predetermined value.

3. A synchronizer as claimed in claim 2, further comprising:
match detector means for detecting a first match between the output signal of said frame sync detector means and the output signal of said first counter means and a second match between the output of said frame sync detector means and the output signal of said second counter means, wherein said updating means comprises:
forward guard counter means for incrementing a count in response to the detection of said first mismatch by said mismatch detector means and generating an output signal when said count reaches a predetermined value;
backward guard counter means for incrementing a count in response to the detection of said second match by said match detector means and generating an output signal when said count reaches a predetermined value; and
gate means for causing the binary count of said first counter means to be updated with the binary count of said second counter means in response to simultaneous presence of the output signals of said forward and backward guard counter means.

4. A synchronizer for establishing synchronization between a data signal and a clock signal, comprising:
frame sync detector means for detecting a frame sync multiplexed with said data signal;
first counter means for continuously incrementing a binary count in response to said clock signal and generating an output signal at frame intervals;
second counter means for incrementing a binary count in response to said clock signal and generating an output signal at frame intervals;
mismatch detector means for detecting a first mismatch between an output signal of said frame sync detector means and the output signal of said first counter means and a second mismatch between the output signal of said frame sync detector means and the output signal of said second counter means;
initializing means for initializing the binary count of said first counter means in response to the output signal of said second counter means upon detection of said first mismatch by said mismatch detector means; and
means for disabling said second counter means in response to the detection of said second mismatch by said mismatch detector means.

5. A synchronizer as claimed in claim 4, further comprising:
match detector means for detecting a first match between the output signal of said frame sync detector means and the output signal of said first counter means and a second match between the output of said frame sync detector means and the output signal of said second counter means, wherein said initializing means comprises:
forward guard counter means for incrementing a count in response to the detection of said first mismatch by said mismatch detector means and generating an output signal when said count reaches a predetermined value;
backward guard counter means for incrementing a count in response to the detection of said second match by said match detector means and generating an output signal when said count reaches a predetermined value;
gate means for producing an output signal upon simultaneous occurrences of the output signals of said forward and backward guard counter means; and
selector means for causing said first counter means to be initialized in response to the output signal of said first counter means in the absence of said output signal from said gate means and causing said first counter means to be initialized in response to the output signal of said second counter means in the presence of said output signal of said gate means.

6. A synchronizer for establishing synchronization between a data signal applied to a data input terminal and a clock signal applied to a clock input terminal, comprising:
frame sync detector means for detecting a frame sync multiplexed with said data signal;
first frame counter means for producing an output signal at frame intervals;
second frame counter means for producing an output signal at frame intervals;
first mismatch detector means having a first terminal for receiving an output signal of said frame sync detector means and a second terminal for detecting a first mismatch between signals at said first and second terminals thereof;
second mismatch detector means having a first terminal for receiving the output signal of said frame sync detector means and a second terminal for detecting a second mismatch between signals at said first and second terminals thereof;
divide-by-2 counter means responsive to an output signal from said first mismatch detector means;
clock gate means having an output terminal for applying said clock signal to the output terminal thereof in the absence of said second mismatch and terminating the application of said clock signal in the presence of said second mismatch; and selector means for respectively establishing first connections from said clock input terminal and the output terminal of said clock gate means to input terminals of said first and second counter means and respectively establishing second connections from output terminals of said first and second counter means to the second terminals of said first and second mismatch detector means in the absence of an output signal from said divide-by-2 counter means, and for reversing said first and second connections in the presence of said output signal from said divide-by-2 counter means.

7. A synchronizer as claimed in claim 6, further comprising:

match detector means for detecting a first match between the output signal of said frame sync detector means and the output signal of said first counter means and a second match between the output of said frame sync detector means and the output signal of said second counter means;

forward gurard counter means for incrementing a count in response to the detection of said first mismatch and generating an output signal when said count reaches a predetermined value;

backward guard counter means for incrementing a count in response to the detection of said second match and generating an output signal when said count reaches a predetermined value; and gate means for supplying an output signal to said divide-by-2 counter means upon simultaneous occurances of the output signals of said forward and backward guard counter means.

8. A synchronizer for establishing synchronization between a data signal applied to a data input terminal and a clock signal applied to a clock input terminal, comprising:

a plurality of latch means connected to said data input terminal and said clock input terminal for respectively latching said data signal in response to said clock signal;

mismatch detector means for detecting a mismatch between output signals of said plural latch means; and phase reversal means for reversing the phase of said clock signal in response to the detection of said mismatch.

9. A synchronizer as claimed in claim 8, wherein said mismatch detector means comprises:

exclusive-OR gate means connected to output terminals of said plural latch means; and bistable means for supplying a signal to said phase reversal means in response to an output signal from said exclusive-OR gate means as an indication of the detection of said mismatch.

10. A synchronizer as claimed in claim 9, wherein said mismatch detector means further comprises:

inverter means for reversing the phase of the clock signal from said phase reversal means; and latch means for latching an output signal of said exclusive-OR gate means in response to an output signal from said inverter means and applying the latched signal to said bistable means as said output signal of said exclusive-OR gate means.

11. A synchronizer as claimed in claim 98 further comprising counter means for incrementing a count in respnse to an output signal from said exclusive-OR gate means and supplying a signal to said bistable means when the count incremented to a predetermined value.

12. A synchronizer as claimed in claim, further comprising delay means connected between said data input terminal and one of said plural latch means.

13. An apparatus for establishing synchronizatoin between a p plurality of data signals on the one hand and a clock signal on the other, said clock signal having a frequency higher than the repetition frequency of each of said data signals by an integer M which is greater than unity, comprising:

divide-by-M counter means for dividing the frequency of said clock signal;

a plurality of bit synchronizers for respectively said data signals, each of said bit synchronizers comprising a plurality of latch means for respectively latching the received data signal in response to a latch timing signal applied thereto and producing an output signal of said bit synchronizer from one of said latch means, mismatch detector means for detecting a mismatch between output signals of said plural latch means and phase reversal means for applying an output signal from said divide-by-M counter means to said plural latch means as said latch timing signal and reversing the phase of said latch timing signal in response to the detection of said mismatch;

retiming means for latching output signals from said bit synchronizers in response to an output signal from said divide-by-M counter means; and delay means for introducing a delay to the signal supplied from said divide-by-M counter means to said retiming means so that it coincides with a steady logic level of each of the output signals of said bit synchronizers.

14. An apparatus as claimed in claim 13, wherein said mismatch detector means of each of said bit synchronizers comprises:

exclusive-OR gate means connected to output terminals of said plural latch means; and bistable means for supplying a signal to said phase reversal means in response to an output signal from said exclusive-OR gate means as an indication of the detectoin of said mismatch.

15. A synchronizer as claimed in claim 14, wherein said mismatch detector means further comprises:

inverter means for reversing the phase of the clock signal from said phase reversal means; and latch means for latching an output signal of said exclusive-OR gate means in respone to an output signal from said inverter means and applying the latched signal to said bistable means as said output signal of said exclusive-OR means.

16. A synchronizer as claimed in claim 14, further comprising counter means for incrementing a count in response to an output signal from said exclusive-OR gate means and supplying a signal to said bistable means when the count incremented to a predetermined value.

* * * * *

UNITED STATES PATENT AND TRADEMARK OFFICE
CERTIFICATE OF CORRECTION

PATENT NO. : 4,965,814

DATED : October 23, 1990

INVENTOR(S) : Norio Yoshida et al.

It is certified that error appears in the above-identified patent and that said Letters Patent is hereby corrected as shown below:

Col. 1, line 42, delete "outof" and insert --out-of--.

Col. 13, line 24, delete "gurard" and insert --guard--.

Col. 14, line 3, delete "98" and insert --9,--;

line 12, delete "p".

Signed and Sealed this

Twenty-sixth Day of May, 1992

Attest:

DOUGLAS B. COMER

Attesting Officer     Acting Commissioner of Patents and Trademarks